Oct. 26, 1965          A. B. LONG          3,213,594
MUD TREATING DEVICE
Filed Oct. 16, 1962          2 Sheets-Sheet 1
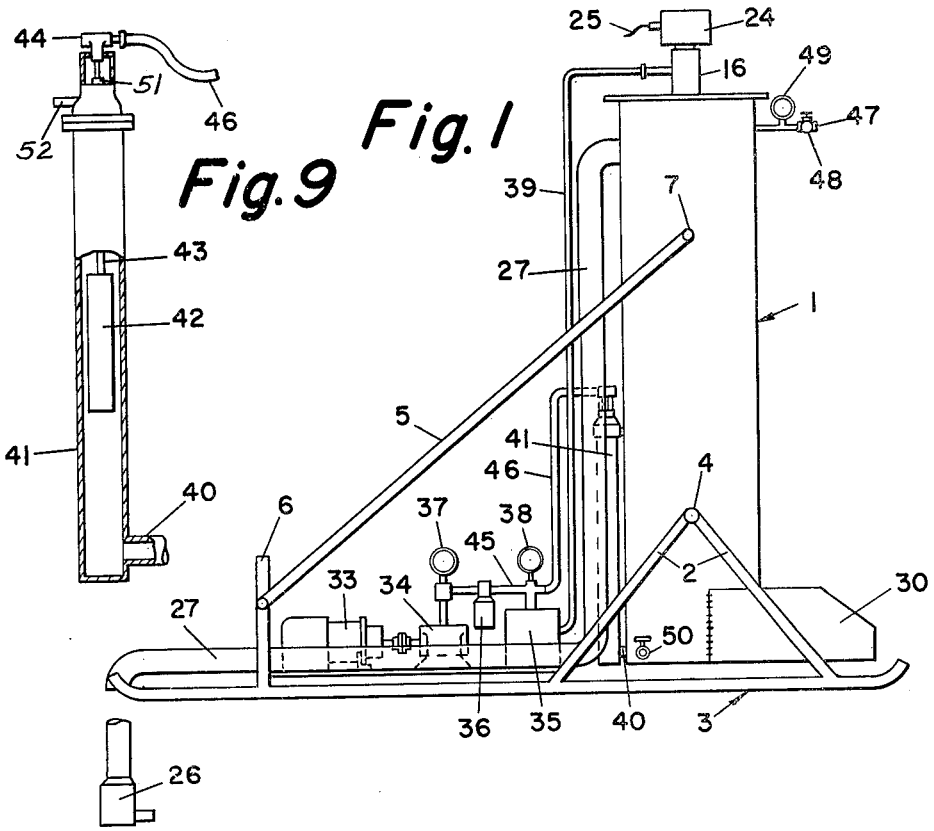
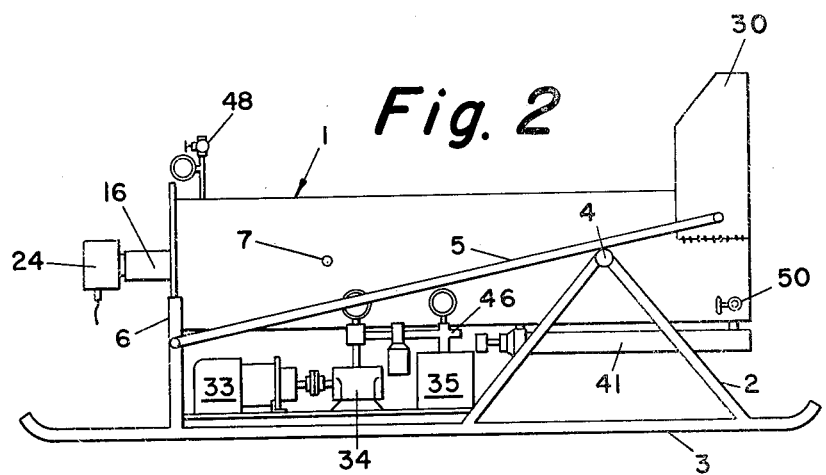
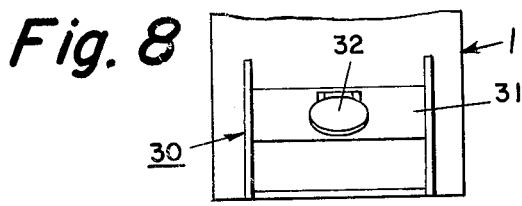
INVENTOR.
ALFRED B. LONG
BY George L. Church
ATTORNEY Oct. 26, 1965     A. B. LONG     3,213,594
MUD TREATING DEVICE
Filed Oct. 16, 1962     2 Sheets-Sheet 2
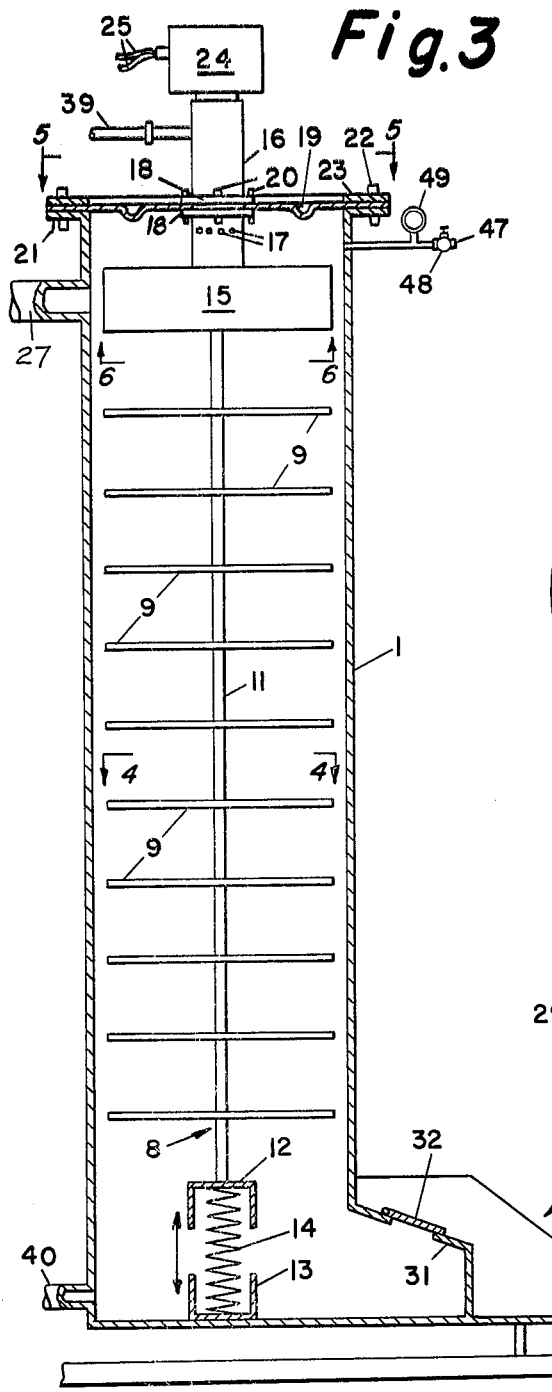
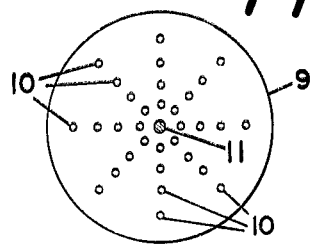
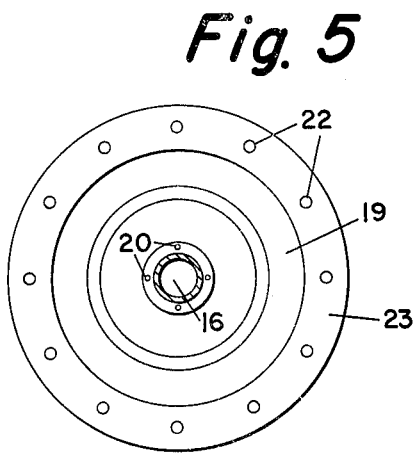
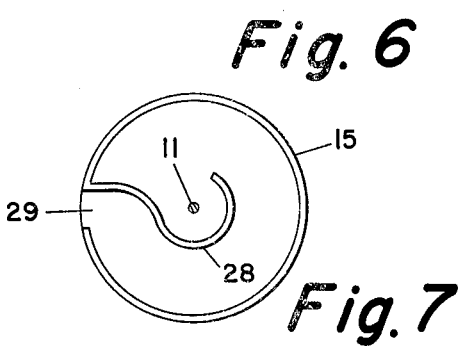
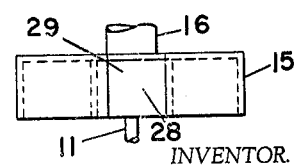
INVENTOR.
ALFRED B. LONG
BY George L. Church
ATTORNEY

3,213,594
MUD TREATING DEVICE
Alfred B. Long, Beaumont, Tex., assignor to Bass Brothers Enterprises, Inc., a corporation of Texas
Filed Oct. 16, 1962, Ser. No. 230,959
17 Claims. (Cl. 55—169)

This invention relates to a device for treating colloidal dispersions (slurries), such as drilling muds used in drilling oil and gas wells by the rotary method.

In the drilling of oil and gas wells by the rotary method, a drilling fluid or mud is used. It has several functions, to wit: downhole lubrication of the drill pipe and bit, cooling of the bit, carrying of the cuttings to the surface, providing a sealer lining for the hole, and providing a hydrostatic head to control formation pressures.

Often, when drilling in areas of high underground pressure, the mud becomes entrained with gas from the formation. That is to say, it becomes gas-cut or gas-laden. As this contaminated mud approaches the surface, expansion of the gas within the mud takes place, charging it with millions of tiny gas bubbles. The effective hydrostatic head provided by the mud is then reduced due to its lowered effective density, creating a situation which may result in the well blowing out. This latter is quite hazardous, as well as expensive. This problem can be solved only by removing the entrained gas from the mud before it is recirculated. Pumping the contaminated mud back down the hole would but aggravate the situation, and could easily result in an expensive "blow-out." There is also a marked increase in mud viscosity when the mud becomes gas-laden.

An object of this invention is to provide a novel device for continuously degassing drilling mud returned from a borehole to the surface.

Another object is to provide a novel drilling mud degasser that is comparatively light in weight, easy to clean, and which has a minimum of moving parts.

A further object is to provide an improved mud degasser having automatic controls for regulating the mud level therein.

The objects of this invention are accomplished, briefly, in the following manner: A series of vertically-spaced perforated plates is mounted inside a vertically-disposed elongated cylindrical chamber or tank, these plates being mounted for movement back and forth along the longitudinal axis of the chamber. During degassing, these plates are moved back and forth in a vibratory manner, by means of an electrically-energized vibrator mounted at one end of the chamber. Gas-laden drilling mud is supplied to the upper part of the chamber, above the uppermost plate, in such a manner that it can cascade downwardly over and through the plates. Because of this cascade action, the device may be termed a "cascade mud degasser." A vacuum pump is coupled to the interior of the chamber, to subject such interior to subatmospheric pressure. The treated (gas-free) mud is withdrawn from the lower part of the chamber, below the lowermost perforated plate. The differential pressure within the chamber is automatically controlled by means of a relief valve operated by a float within a float chamber coupled to the main chamber. For purposes of transportation, between degassing operations, the chamber is pivotable on a framework to a position wherein it is horizontally disposed.

Speaking generally, as the high viscosity gas-entrained or gas-laden mud cascades over and through the vibrating assembly or reactor, the small gas bubbles combine, thereby increasing in size. These larger bubbles move toward the mud surface and break. The vacuum pump creates a negative pressure differential, as well as facilitating the removal of gas from the device. Removal of the bubbles and redispersion of the colloidal particles results in reducing the viscosity to near its original value. The reconditioned, gas-free mud (fluid) is discharged from the device through a fluid check valve, back into the drilling rig mud system, for re-use.

There will now be presented a description of the theory involved in the degassing of drilling mud by the device of this invention.

There are, in general, eight kinds of colloidal systems, as set forth below.

| | Dispersed Phase | Continuous Phase | Example |
|---|---|---|---|
| 1 | Solid | Gas | Carbon/air (smoke). |
| 2 | Solid | Liquid | Clay/water (mud). |
| 3 | Solid | Solid | Carbon black/rubber. |
| 4 | Liquid | Gas | Water/air (fog). |
| 5 | Liquid | Liquid | Water/oil. |
| 6 | Liquid | Solid | Water/clay. |
| 7 | Gas | Liquid | Air/water (foam). |
| 8 | Gas | Solid | Helium, trapped in rocks as result of radioactive decay. |

Gas-cut drilling mud has a very complex nature. Normally, the continuous phase is water and the dispersed phase is clay. Thus, it is of type No. 2 set forth in the above schedule. However, when mud is subject to gas-cutting or gas-entrainment, it undergoes varying and continuous changes in phase. Gas can form a dispersed phase, a continuous phase, or any combination of the two.

In gas laden mud, there are several colloidal forces involved. The two most important are surface tension and electrical attraction-repulsion forces. To illustrate the surface area of small particles and the consequent importance of these "surface" forces, let us consider particles of colloidal dimensions. The literature indicates that the surface area of the particles in a single pound of carbon black is approximately twelve acres. Small bubbles in gas-laden drilling mud, although usually larger than colloidal size when they flow from the well, also have a tremendous "active" area. Such areas play a major role in colloids.

The various chemicals contained in the water used in mud create strong surface tension, and also create electrical charges on the bubble surface. To a limited degree, the electrical charges on the bubble skin or surface can repel or attract, depending on the chemicals in the system. Also, under certain conditions, Brownian movement may affect the combining of small bubbles of gas, by collisions and erratic motions. Gas-cut mud is therefore in a continuous state of change. The force of gravity on the bubbles is negligible, so that they tend to float freely in the mud.

The bubbles always tend to contract and occupy the smallest possible surface area, which is a sphere. Further, the internal pressure of small bubbles is greater than that of large ones. Therefore, if a small bubble comes in contact with a large one and the adjoining "skins" are ruptured, the two bubbles become one, with a lower internal pressure. It is also known that large bubbles oscillate much more slowly than small ones, when subjected to a moving force.

In the device of this invention, a moving force, which increases the "active" area subjected to treatment, is supplied in the form of a vibrating reactor. As the gas-entrained mud flows into the containing vessel or chamber and cascades over and through the vibrating perforated plates of the reactor, the gas bubbles are brought forcibly into contact with each other. The gas bubbles grow into a size sufficient to allow the differential pressure (subatmospheric pressure) created by the vacuum pump to break the large bubbles and extract the gas from the device. In this connection, it will be recalled that the internal pressure of large bubbles is less than that of small ones, which accelerates bubble growth upon contact.

The force of gravity also plays an important part in gas-mud separation. The specific gravity of gas is very small, in relation to that of mud. As the reactor plates (vibrating perforated plates) move upward, they carry mud with small gas bubbles at approximately the same velocity. On its downward movement, the mud tends to fall slightly faster than the enlarged gas bubbles, causing some of the latter to migrate to the mud surface. In this connection, it is pointed out that the enlarged gas bubbles referred to are created by enforced random collisions. This migration to the mud surface aids in the concentrating action, thereby increasing the rate of bubble contact as the mud cascades over each reactor plate. The accelerated bubble growth causes the gas to be more quickly released by pressure differential (created by the vacuum pump).

A detailed description of the invention follows, taken in conjunction with the accompanying drawings, wherein:

FIG. 1 is a front elevation of the complete device, in erected, operative position;

FIG. 2 is a view similar to FIG. 1, but illustrating the device as "knocked down" for highway transport;

FIG. 3 is a vertical section through the chamber or tank;

FIG. 4 is a horizontal section taken on line 4—4 of FIG. 3;

FIG. 5 is a horizontal section taken on line 5—5 of FIG. 3;

FIG. 6 is a horizontal section taken on line 6—6 of FIG. 3;

FIG. 7 is an elevational view of a detail;

FIG. 8 is a partial front view of the chamber, looking at the discharge side thereof; and FIG. 9 is a sectional view, on an enlarged scale, of the float control portion of the device.

Referring first to FIG. 1, a hollow cylindrical chamber or vessel 1 is supported by means of a pair of frames 2 (only one of which is shown in FIG. 1), in the shape of inverted V's, on a skid-type supporting framework 3. The lower ends of the frames 2 are welded or otherwise securely fastened to skid 3, and the upper ends or "points" of the frames pivotally engage pivot pins 4 secured to the vessel 1 at diametrically-opposite locations. As illustrated in FIG. 1, during use of the device for degassing the cylindrical chamber or tank 1 is supported in an upright position, i.e., with its longitudinal axis substantially vertical. It is held in this position by means of a pair of rigid support rods 5 secured at one end to respective upright posts 6 forming a part of skid 3, and secured at their opposite ends to respective pins 7 which are mounted on vessel 1 at diametrically-opposite locations.

In order to transport the device over the highways, support rods 5 are detached from pins 7, and the chamber 1 is rotated about pivot pins 4 to position the tank horizontally, as illustrated in FIG. 2. In this latter position, the longitudinal axis of the tank or chamber is substantially horizontal. The "upper" end (in FIG. 1) of the tank is allowed to come to rest in a saddle (not shown) which extends between the two posts 6.

Now referring to FIG. 3, a reactor assembly, denoted generally by the numeral 8, is mounted in chamber 1. This assembly includes a plurality of spaced parallel circular plates 9 (here shown as being ten in number) whose planes extend transversely to the longitudinal axis of the cylindrical tank 1. Each of these plates has a multiplicity of perforations or holes 10 therein. See FIG. 4, which is a horizontal section through the chamber, looking down on one of the plates. The diameter of each plate 9 is somewhat less than the internal diameter of chamber 1, so there is a small annular clearance between the periphery of each plate and the inner cylindrical wall of chamber 1. To support the plates, as well as to produce vibratory movement thereof in a manner to be described hereinafter, an axially-extending post 11 extends through the centers of the plates 9, and each plate is welded at its center to this post.

An open-ended hollow cylindrical spring retainer 12 (open only at its lower end) is welded to the lower end of post or rod 11. A similar spring retainer 13 (open only at its upper end) is welded to the lower closed end of chamber 1, in alignment with spring retainer 12. A compression spring 14 is held in place by retainers 12 and 13, the upper end of this spring bearing against the closed upper end of retainer 12 (and thus also against the lower end of rod 11) and the lower end of this spring in effect bearing against the bottom wall of chamber or tank 1. Thus, the reactor assembly 8 rests on spring 14, and this spring mounts the lower end of the reactor assembly 8 for up-and-down (axial) movement within chamber 1.

A distributor head 15 (to be described in more detail hereinafter) is secured to the upper end of post 11, and a cylindrical gas-collecting compartment 16 of suitable diameter is fastened to the upper or top side of head 15, centrally of this head and substantially axially of chamber 1. Compartment 16 has a plurality of apertures or holes 17 through its wall, which permit the passage or flow of gas from the upper end of chamber 1 into the interior of compartment 16.

The elements 16, 15, 11, and 9 all are parts of the vibrating reactor assembly 8. In order to mount the upper end of this assembly for axial back-and-forth (vibratory) movement within chamber 1, a pair of similar spaced flanges 18 are secured to the outside of compartment 16, approximately centrally of the length of this compartment. The inner periphery of a flexible annular diaphragm 19 is secured by means of bolts 20 between the two flanges 18 (see FIG. 5 also). At its upper end, chamber 1 has an outwardly-extending annular flange 21. The outer periphery of diaphragm 19 is secured by means of bolts 22 between tank flange 21 and an annular flange plate 23. The diaphragm 19 thus centers the top of assembly 8 in chamber 1, and also mounts the upper end of this reactor assembly for axial movement within chamber 1.

The top of compartment 16 is closed, and is provided with a suitable means (not shown) for coupling a source of energy 24 (e.g., a vibrator), with a mechanically-vibrating output, to the reactor assembly 8. When mechanical vibratory energy is supplied by the reactor assembly 8, the entire reactor assembly, including of course plates 9 and head 15, is vibrated back-and-forth (i.e., up-and-down) in chamber 1 along the axis thereof, as indicated by the arrows in FIG. 3. The amplitude of movement of the reactor assembly has an order of magnitude of ¼" to ½".

Various types of conventional transducers (vibrators) with a mechanically-vibrating output may be used as a source of energy 24 to supply the vibratory energy for driving the reactor assembly 8. Examples of three types are: (1) pneumatically operated (or air-driven) vibrator; (2) motor-driven mechanical vibrator; and (3) electrically-oscillating-armature-type vibrator. The source of electrical power on drilling rigs may be either alternating current (A.C.) or direct current (D.C.). When D.C. is available on a rig, a converter is required to supply the proper power for operating the last-mentioned type of vibrator. The last-mentioned type of vibrator operates on pulsating D.C., which when A.C. is available may be supplied by a half-wave rectifier circuit, comprising a diode (selenium rectifier) connected in series with the driving coil of the transducer (vibrator) and one side of the A.C. line. Such rectifier, along with the necessary controls, may be housed in an explosion-proof box (not shown) mounted on skid 3. The electrical connections to the vibrator are indicated at 25 in FIGS. 1 and 3.

The fluid or slurry to be treated (drilling mud) is propelled into the vertical cylindrical chamber 1 by a suitable pump, or by a jet of conventional design. As illustrated in FIG. 1, a mud jet 26 (shown schematically) forces the gas-laden mud from a drilling rig mud tank (not shown) upwardly through a pipe 27 to a level horizontally aligned with the distributor head 15, and above the uppermost one of the plates 9. It is discharged into the chamber 1 at this level by way of an aperture provided in the chamber 1, into which aperture the upper end of pipe 27 is sealed.

The distributor head 15 (see FIGS. 6 and 7) is a hollow cylinder having one open end (to wit, its lower or bottom end) and having therein a curved (spiral) vane 28 whose height is equal to that of the cylinder. A rectangular aperture (open area) 29 is formed in the cylindrical wall of head 15, in alignment with the discharge end of pipe 27, to serve as a mud inlet. See FIG. 7, which is a side view of the distributor head. Aperture 29 has a height equal to that of the cylinder, and a suitable width; one vertical edge of this aperture coincides with the radially-outer end of vane 28 (see FIG. 6).

Mud from the input pipe 27 has sufficient inertia or velocity to flow across the plate-tank annular space (clearance) and enter the mud inlet 29 of distributor head 15. The curved vane 28 causes the mud to rotate (i.e., follow a more or less circular path). This sets up a limited centrifugal force, which is advantageous. The mud falls out of the open bottom of head 15, being distributed by this head so as to fall more or less evenly upon the uppermost perforated plate 9 of the reactor assembly 8. Thereupon, the fluid cascades downwardly, over and through succeeding (lower) perforated plates 9.

One end of an outlet or discharge box or chute 30, which extends more or less transversely to the longitudinal axis of the chamber, is adapted to communicate with the interior of chamber 1, at the lower end thereof. The upper side of chute 30 is open to the atmosphere, and the sides of this chute are imperforate. The outer end of the chute is open. An inclined partition 31 extends entirely across the chute 30, from one side to the other thereof. This partition has a central aperture therein which communicates with the interior of chamber 1, but is otherwise imperforate. This latter aperture is closed by a check valve or flapper valve 32, which is circular in shape (see FIG. 8) and is hinged at its back side within the outlet box 30, so that it can open outwardly (upwardly). The discharge check valve 32 acts as a check vlave between the outside atmosphere and the chamber internal pressure. It is a component of the automatic control for regulating fluid discharge, level, and the differential pressure in chamber 1. That is to say, it opens outwardly, to allow mud discharge from chamber 1, when the forces due to gravity, hydrostatic pressure, and atmospheric pressure are in proper relation. This will be referred to further hereinafter.

The reconditioned (gas-free) mud, which flows outwardly from chamber 1 through chute 30 after passing through the discharge check valve 32, is returned to the rig mud system (by way of a rig mud tank, for example) for re-use.

The differential pressure system for the degasser includes an electric motor 33 (see FIG. 1), mounted on skid 3, which drives a conventional vacuum pump 34 by means of a direct coupling. Also included is a moisture trap 35, which is coupled by means of a line 45 to pump 34, a filter 36 being included in the line 45 between pump 34 and trap 35. Gauges 37 and 38 are coupled to the line, gauge 37 being near pump 34 and gauge 38 being near trap 35. A flexible hose 39 connects the differential pressure system described to the gas compartment 16, above diaphragm 19, one end of hose 39 being connected to trap 35 and the other end thereof being connected to the interior of gas-collecting compartment 16.

Gas is moved and discharged to the atmosphere by the pump 34, which creates a differential pressure (sub-atmospheric pressure) within compartment 16 and chamber 1. This gas passes through hose 39, trap 35, and filter 36 to pump 34, and thence to the atmosphere. Actually, vacuum plays a dual role in the device of this invention. First, it aids the jet in the flow of mud into the machine; second, it completes the gas bubble-breaking and gas discharge process.

A differential pressure float valve fluid level control arrangement is provided. This will now be described. One end of a pipe 40 of suitable diameter (a somewhat restricted diameter) is welded into tank 1, near the bottom thereof. The other end of this pipe communicates with the lower end of a vertically-extending float chamber 41 (see FIG. 9) in which there is positioned a float 42. Float chamber 41 has a height which is somewhat less than half the height of chamber 1, and is mounted securely on the outside of chamber 1 at a location circumferentially spaced from the location of mud inlet pipe 27 (see FIG. 1). The float 42 is attached to the lower end of a push rod 43 whose upper end extends through a gland 51 and is attached to a spring-loaded relief valve 44 mounted at the top of float chamber 41. The float 42 can actuate the relief valve 44 to control the differential pressure (vacuum) within tank 1. Relief valve 44 is adapted to open to the atmosphere, and is coupled by means of a hose 46 (see FIGS. 1 and 9) to pipe 45, above trap 35.

Float 42 actuates valve 44 (by means of rod 43) when the mud level in the float chamber 41 reaches a predetermined height or level. Opening of valve 44 allows air (atmosphere) to be drawn into the tank 1 by way of hose 46, trap 35, and hose 39, reducing the vacuum in tank 1 and thus reducing the force exerted by the atmosphere on the mud, by reducing the differential pressure inside the chamber 1. Thus, the float-controlled valve 44, in conjunction with the check valve 32, regulates the fluid level within the chamber 1.

The gland 51 does not contain any packing, thereby allowing some atmospheric leakage into the top of float chamber 41 at all times. This "blow-by" is not of sufficient volume to impair the initial flow of mud through the machine. In fact, it greatly reduces gland friction, allowing a more sensitive float-valve action. A pipe 52 (see FIG. 9), in which there is mounted a spring-loaded check valve (not shown), communicates with the top of float chamber 41 and with the atmosphere. This check valve is an added precaution (in addition to the "leaky" gland 51) against the float chamber 41 becoming air bound.

Flow of the mud through the machine of this invention depends on forces created by the jet 26, on atmospheric pressure differential (created by vacuum pump 34), and on gravity. It is necessary for the above-mentioned forces to maintain a constant relation to each other. The mud jet or input system 26, 27, etc., must be assisted by the pressure differential (created within the chamber 1 by the vacuum system 34, 39, etc.) for a through flow to be maintained. These forces must be automatically controlled, to allow gravity discharge. This control is accomplished by the automatic float-controlled valve 44 (pressure regulator valve) and the discharge check valve 32.

When the degasser is put in service, valves 44 and 32 are normally closed. To operate the machine, the vacuum system 34, 39, etc. is actuated. The differential pressure (vacuum) created within the chamber 1 causes mud to flow up the pipe 27 and fill the tank 1 to a level at which relief valve 44 is actuated. The mud jet 26 is then turned on. The vacuum in the tank assists (i.e., works in conjunction with) the jet to flow varying specific gravity mud into vessel 1. As the mud reaches a predetermined fluid level, the float-controlled valve 44 regulates by reducing the differential pressure exerted on the mud flow (i.e., it reduces the vacuum inside chamber 1). The degassed mud in the lower portion of chamber 1, having a higher specific gravity with controlled hydrostatic head, causes gravitational force to take over, allowing flow through the discharge check valve 32.

Summarizing the action of the mud treating device of this invention, gas-laden drilling mud is flowed into the degasser chamber 1 by a jet 26 or a suitable pump, the differential pressure (vacuum) within the chamber assisting in this flow, as previously explained. Upon entering the degasser vessel 1, the mud is evenly distributed by an open-bottom, spiral-vane distributor head 15, which is the top element of the reactor assembly 8. This allows the mud to fall on the uppermost one of the vibrating, perforated bubble plates 9. It then cascades downward through the series of plates 9, with the gas being progressively removed from the mud. The theory of this has been set forth hereinabove. The reconditioned (gas-free) mud is then returned (via the discharge check valve 32 and the chute 30) to the rig mud system, for re-use. The removed gas is withdrawn from the vessel by means of hose 39 and vacuum pump 34.

Provisions are made for washing the machine, after use. A water hose connection 47, including a valve 48 and a gauge 49, extends into the interior of chamber 1, at the top thereof. Valve 50, at the bottom of chamber 1 and communicating with the interior thereof, is the means for draining off wash water. The wash water is turned on with the reactor assembly 8 vibrating, resulting in thorough cleaning of the internal components of the machine.

The invention claimed is:

1. A device for degassing drilling mud comprising an elongated substantially cylindrical chamber having an outer wall disposed with its longitudinal axis extending approximately vertically, a vibratory assembly comprising a plurality of vibratory plates mounted for reciprocation in said chamber, means for moving said vibratory assembly back and forth in said chamber along the axis thereof, means for supplying gas-laden drilling mud under pressure to the upper part of said chamber above the uppermost plate therein, said vibratory plates being vertically spaced from each other and radially spaced from the chamber wall, and being apertured to permit passage of gas-laden mud therethrough, whereby said mud can travel downwardly over and through said plates, means for subjecting the interior of said chamber to subatmospheric pressure, and means for withdrawing gas-free mud from the lower part of said chamber below the lowermost plate therein.

2. A device as defined in claim 1, wherein said supplying means includes a distribution element for distributing the gas-laden mud substantially uniformly over the area of the uppermost plate.

3. A device as defined in claim 1, wherein said chamber is movable, between degassing operations, to a position wherein its longitudinal axis extends approximately horizontally, for transportation purposes.

4. A device as defined in claim 1, wherein said chamber is pivotally mounted on a supporting framework, so that said chamber may be rotated, between degassing operations, to a position wherein its longitudinal axis extends approximately horizontally.

5. A device as defined in claim 1, wherein the first-mentioned means includes a supporting member secured to all of said plates and resiliently mounted in said chamber.

6. A device as defined in claim 1, wherein the first-mentioned means includes a power-driven vibrator coupled to said plates.

7. A device as defined in claim 1, wherein the first-mentioned means includes a supporting member secured to all of said plates and resiliently mounted in said chamber, and a power-driven vibrator coupled to said supporting member.

8. A device as defined in claim 1, including also means responsive to the mud level in said chamber for controlling said subjecting means.

9. A device in accordance with claim 8, wherein said controlling means acts to reduce the subatmospheric pressure in said chamber when the mud therein rises to a predetermined level.

10. A device in accordance with claim 8, wherein said controlling means comprises a float-controlled valve coupled to said subjecting means and responsive to the mud level in said chamber.

11. A device as defined in claim 1, wherein said last-mentioned means includes means for permitting mud to flow only outwardly, in a direction away from the interior of said chamber.

12. A device in accordance with claim 11, wherein said permitting means comprises a flapper-type check valve.

13. An apparatus for degassing drilling mud comprising a vertically disposed mud degassing vacuum chamber having an outer wall, mud inlet means for supplying drilling mud to be treated to the upper portion of said chamber, means for subjecting the interior of said chamber to subatmospheric pressure, means for further subjecting said mud while under subatmospheric pressure to vibratory and separatory mechanical forces, comprising a vibratory reactor assembly mounted below the mud inlet means, said assembly including a plurality of agitator plates spaced vertically from each other and radially spaced from the outer wall of the chamber and having perforations therethrough to permit downward passage of mud, and mud outlet means for withdrawing gas-free mud from the chamber after having passed said vibratory reactor assembly.

14. An apparatus as set forth in claim 13, wherein the mud outlet means is provided with a normally closed check valve which is openable under the pumping action of said vibratory reactor.

15. An apparatus as set forth in claim 13, wherein the means for supplying drilling mud to the mud degasser chamber includes a pipe having a mud jet therein whereby the feeding efficiency of said mud supplying means is improved.

16. An apparatus as set forth in claim 13, wherein said plate assembly includes a central rod on which the plates are mounted, and means for resiliently mounting the lower end of said assembly rod.

17. An apparatus as set forth in claim 13, wherein the vibrator reactor assembly is provided with laterally oscillating actuating means.

References Cited by the Examiner

UNITED STATES PATENTS

| | | | |
|---|---|---|---|
| 173,782 | 2/76 | Graves | 209—355 X |
| 1,518,784 | 12/24 | Gibson | 55—39 |
| 1,667,139 | 4/28 | Borden | 55—193 |
| 1,756,288 | 4/30 | Gray et al. | 55—206 X |
| 2,071,393 | 2/37 | Doherty | 55—206 X |
| 2,076,498 | 4/37 | Farwell | 55—165 X |
| 2,191,504 | 2/40 | Smith | 209—315 |
| 2,197,539 | 4/40 | Hickman | 55—206 |
| 2,206,507 | 7/40 | Kuhni | 55—199 X |
| 2,264,223 | 11/41 | Stancliffe | 209—327 |
| 2,507,797 | 5/50 | Martin | 55—55 X |
| 2,540,390 | 2/51 | Gorgerat et al. | 55—192 |
| 2,592,676 | 4/52 | Franklin | 209—397 X |
| 2,706,531 | 4/55 | Lovelady et al. | 55—174 |
| 2,748,884 | 6/56 | Erwin | 55—193 |
| 2,797,767 | 7/57 | Brooke et al. | 55—55 X |
| 3,098,037 | 7/63 | Tonjes et al. | 209—315 X |

REUBEN FRIEDMAN, *Primary Examiner.*